US012665852B2

(12) United States Patent
Padebettu

(10) Patent No.: US 12,665,852 B2
(45) Date of Patent: Jun. 23, 2026

(54) ENABLING DYNAMIC SERVICE FLOWS IN CABLE CONVERGENCE NETWORKS

(71) Applicant: Juniper Networks, Inc., Sunnyvale, CA (US)

(72) Inventor: Venkatesh Padebettu, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/816,675

(22) Filed: Aug. 27, 2024

(65) Prior Publication Data

US 2026/0019371 A1 Jan. 15, 2026

(30) Foreign Application Priority Data

Jul. 12, 2024 (IN) .............................. 202441053279

(51) Int. Cl.
*G06F 15/16* (2006.01)
*H04L 12/28* (2006.01)
*H04L 47/24* (2022.01)

(52) U.S. Cl.
CPC .......... *H04L 47/24* (2013.01); *H04L 12/2801* (2013.01)

(58) Field of Classification Search
CPC ............................. H04L 47/24; H04L 12/2801
See application file for complete search history.

(56) References Cited

U.S. PATENT DOCUMENTS 7,161,945 B1 * 1/2007 Cummings ............. H04L 47/21
725/94

| | | | |
|---|---|---|---|
| 7,747,737 B1 * | 6/2010 | Apte ........................ H04L 45/38 |
| | | | 709/224 |
| 10,122,625 B2 * | 11/2018 | Biswal .................... H04L 45/16 |
| 2008/0130641 A1 * | 6/2008 | Lee ..................... H04L 47/2441 |
| | | | 375/222 |
| 2021/0112437 A1 | 4/2021 | Wu |
| 2021/0352521 A1 * | 11/2021 | Pan ........................ H04L 47/805 |
| 2022/0200890 A1 * | 6/2022 | Nagarajan ........... H04L 47/2441 |

(Continued)

OTHER PUBLICATIONS

Extended European Search Report for European Application No. EP25174585.7 dated Jul. 30, 2025, 10 pages.

*Primary Examiner* — Razu A Miah
(74) *Attorney, Agent, or Firm* — Harrity & Harrity, LLP

(57) ABSTRACT

Dynamic service flows are enabled in cable convergence networks which can include a cable modem device, a cable modem termination system (CMTS), and an access gateway function (AGF) device. An access gateway function (AGF) device receives, from an access and mobility management function (AMF) device of a core network, quality of service (QoS) information associated with a packet data unit (PDU) session of a cable modem device. The AGF device determines, based on the QoS information, QoS match criteria information. The AGF device sends, to a cable modem termination system (CMTS) associated with the cable modem device and via an interface, such as a common open policy service (COPS) interface, between the AGF device and the CMTS, a service flow creation message that includes the QoS match criteria information. Sending the service flow creation message enables the CMTS to create a first service flow between the CMTS and the cable modem device, and the cable modem device to create a second service flow between the cable modem device and the CMTS.

20 Claims, 8 Drawing Sheets

(56) References Cited

U.S. PATENT DOCUMENTS

2022/0210080 A1* 6/2022 Nagarajan ........... H04L 47/2475
2023/0232301 A1* 7/2023 Wong ................... H04W 76/10
370/331

* cited by examiner

500

510 — Receive quality of service (QoS) information associated with a packet data unit (PDU) session of a cable modem device 520 — Determine QoS match criteria information 530 — Send a service flow creation message that includes the QoS match criteria information

ENABLING DYNAMIC SERVICE FLOWS IN CABLE CONVERGENCE NETWORKS

CROSS-REFERENCE TO RELATED APPLICATION

This Patent application claims priority to India patent application No. 202441053279, filed on Jul. 12, 2024 and entitled "ENABLING DYNAMIC SERVICE FLOWS IN CABLE CONVERGENCE NETWORKS." The disclosure of the prior Application is considered part of and is incorporated by reference into this Patent Application.

BACKGROUND

A cable convergence network (CCN) refers to a modern cable network architecture that integrates multiple services, such as television, Internet, and voice, over a single, unified infrastructure. A CCN can be integrated with a core network, such as a fifth generation (5G) core network, to provide additional capabilities to the CCN.

SUMMARY

In some implementations, an access gateway function (AGF) device includes one or more memories; and one or more processors to: receive, from an access and mobility management function (AMF) device of a core network, quality of service (QoS) information associated with a packet data unit (PDU) session of a cable modem device; determine, based on the QoS information, QoS match criteria information; and send, to a cable modem termination system (CMTS) associated with the cable modem device, a service flow creation message that includes the QoS match criteria information.

In some implementations, a non-transitory computer-readable medium storing a set of instructions includes one or more instructions that, when executed by one or more processors of an access gateway function (AGF) device, cause the AGF device to: receive, from a core network, quality of service (QoS) information associated with a packet data unit (PDU) session of a cable modem device; and send, to a cable modem termination system (CMTS) associated with the cable modem device, a service flow creation message that includes QoS match criteria information associated with the QoS information.

In some implementations, a method includes obtaining, by an access gateway function (AGF) device, quality of service (QoS) information associated with a packet data unit (PDU) session of a cable modem device; and sending, by the AGF device, to a cable modem termination system (CMTS) associated with the cable modem device, and based on the QoS information, a service flow creation message.

DETAILED DESCRIPTION

Figure 1A:
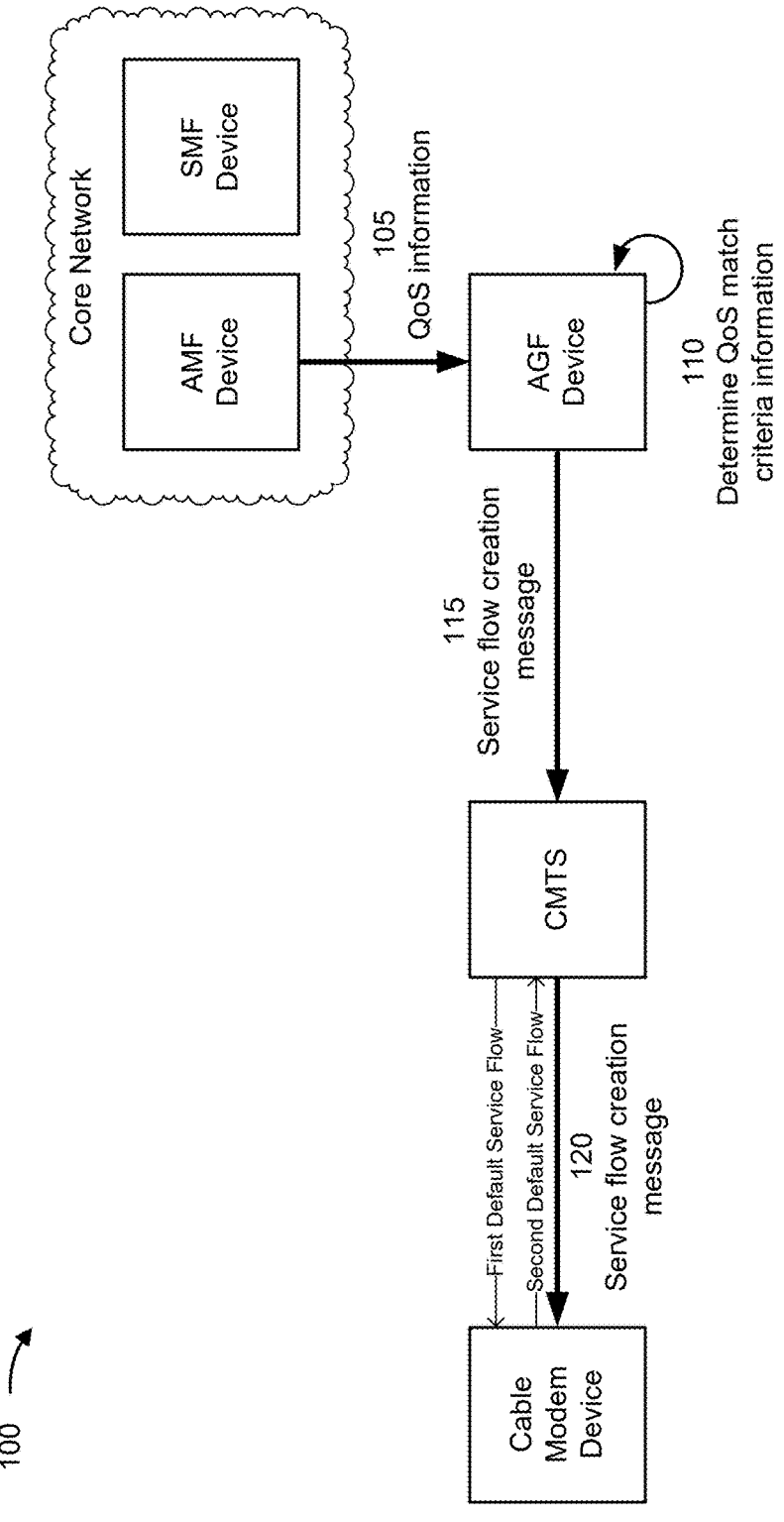
FIGS. 1A-1D are diagrams of an example implementation associated with enabling dynamic service flows in CCNs.

The following detailed description of example implementations refers to the accompanying drawings. The same reference numbers in different drawings may identify the same or similar elements.

In a cable convergence network (CCN), a cable modem is connected to a cable modem termination system (CMTS) via a wireline connection (e.g., information is transmitted over a physical element, such as a fiber optic able, a coaxial cable, a twisted pair cable, and/or the like). Typically, the wireline connection supports a default downstream service flow (e.g., that supports transmission of data packets from the CMTS to the cable modem) and a default upstream service flow (e.g., that supports transmission of data packets from the cable modem to the CMTS). Without any further configuration to the cable mode and the CMTS, all data packets transmitted between the cable modem and the CMTS are transmitted via these default service flows (e.g., over the wireline connection), and therefore the data packets are provided with a same quality of service (QoS) treatment. This may not be preferred, or optimal, such as when the CCN includes a core network (e.g., a 5G core network) that enables QoS differentiation for different types of traffic (e.g., voice traffic, video traffic, video conferencing traffic, or other types of traffic).

In some cases, the cable modem and the CMTS can be configured to support additional service flows over the wireline connection (e.g., in addition to the default service flows). For example, the cable modem and the CMTS can be configured to support pairs of service flows (e.g., upstream/downstream pairs of service flows) that enable satisfaction of different QoS criteria. However, these additional service flows are typically created at a time of initialization of the wireline connection, and therefore have statically defined QoS characteristics that may not be tailored to provide a preferred, or optimal, QoS treatment for particular data packet flows. Further, computing resources (e.g., processing resources, memory resources, communication resources, and/or power resources, among other examples) of the cable modem and the CMTS are consumed to maintain these additional service flows, even when the service flows are not utilized.

Some implementations described herein include a CCN that includes a cable modem device, a CMTS, and an access gateway function (AGF) device. The AGF device is connected to a core network (e.g., a 5G core network) and receives QoS information associated with a packet data unit (PDU) session of the cable modem device (e.g., that indicates a QoS flow identifier (QFI) associated with a packet flow of the PDU session of the cable modem device and, optionally, one or more QoS parameters associated with the packet flow). The AGF device determines, based on the QoS information, QoS match criteria information (e.g., that indicates a service flow identifier associated with the QFI and, optionally, QoS policy information associated with the one or more QoS parameters) and sends, to the CMTS, a service flow creation message that includes the QoS match criteria information. This enables the CMTS to create a first non-default service flow (e.g., a first non-default downstream service flow) between the CMTS and the cable modem device, and enables the cable modem device to create a second service flow (e.g., a second non-default upstream service flow) between the cable modem device and the CMTS.

Notably, each non-default service flow can be configured to provide a preferred, or optimal, QoS treatment for data packet flows associated with the service flow identifier (e.g., based on the QoS policy information). In this way, a performance of the CCN is improved (e.g., by providing a preferred, or optimal, transmission of the data packet flows). Further, the non-default service flows can be dynamically created (and dynamically terminated, as further described herein), and therefore computing resources (e.g., processing resources, memory resources, communication resources, and/or power resources, among other examples) of the cable modem and the CMTS are not wasted to maintain unused, non-optimal, statically-configured service flows.

Further, the AGF device can be configured to be connected via a common open policy service (COPS) interface (or a similar type of interface) between the AGF device and the CMTS. The CMTS is natively configured to support a COPS interface, such as when the CMTS communicates with a packet cable multimedia (PCMM) device, so additional configuration of the CMTS is not required. Accordingly, the AGF device may provide the service flow creation message as a COPS message, which the CMTS is able to process (e.g., without further configuration of the CMTS) to enable creation of the non-default service flows. In this way, some implementations described herein enable dynamic service flows in a CCN without any physical (e.g., hardware) changes to devices and/or systems in the CCN.

FIGS. 1A-1D are diagrams of an example implementation 100 associated with enabling dynamic service flows in CCNs. As shown in FIGS. 1A-1D, example implementation 100 includes a cable modem device, a CMTS, an AGF device, an access and mobility management function (AMF) device, and/or a session management function (SMF) device. These devices are described in more detail below in connection with FIGS. 4-6. These devices may be associated with a CCN, where the AMF device and/or the SMF device may be included in a core network (e.g., a 5G network) of the CCN.

The cable modem device may be connected to the CMTS via a wireline connection. The wireline connection may include, for example, a cable network connection, or another type of wireline connection. The wireline connection (and the cable modem device and the CMTS) may support multiple service flows. A service flow may be, for example, an upstream service flow (e.g., that supports transmission of data packets from the cable modem device to the CMTS) or may be a downstream service flow (e.g., that supports transmission of data packets from the CMTS to the cable modem device).

As shown in FIG. 1A, and by reference number 105, the AGF device may obtain QoS information. The QoS information may be associated with a PDU session of the cable modem device. For example, the QoS information may indicate QFI associated with a packet flow of the PDU session of the cable modem device and, optionally, one or more QoS parameters associated with the packet flow. The one or more QoS parameters may indicate, for example, a bandwidth requirement, a latency requirement, a priority requirement, and/or similar requirements. In some implementations, the QoS information may be referred to as 5G QoS information (e.g., when the core network is a 5G core network and the PDU session is associated with the 5G core network).

In some implementations, the AGF device may obtain the QoS information from the core network. For example, the AMF device (or the SMF device, via the AMF device) may provide the QoS information to the AGF device, such as in association with a router gateway level wireline access characteristic (RG-LWAC) registration procedure. Accordingly, the AMF device may send the QoS information to the AGF device via an interface of the core network, such as an N2 interface (that is defined by the Third Generation Partnership Project (3GPP)) of the core network. That is, the AGF device may receive the QoS information from the core network (e.g., from the AMF device) via the interface of the core network.

As shown by reference number 110, the AGF device may determine QoS match criteria information. The QoS match criteria information may indicate a service flow identifier associated with the QFI (e.g., that is indicated by the QoS information) and, optionally, QoS policy information associated with the one or more QoS parameters (e.g., that are indicated by the QoS information). The service flow identifier may include, for example, at least one of an Internet protocol (IP) differentiated services code point (DSCP) or a virtual local area network (VLAN) priority code point (PCP) (e.g., that are to be included in data packets transmitted between the cable modem device and the CMTS). The QoS policy information may indicate, for example, a level of service quality that data packets should receive as the data packets are transmitted between the cable modem device and the CMTS (e.g., when the data packers are associated with the service flow identifier).

The AGF device may determine the QoS match criteria information based on the QoS information. For example, the AGF device may process the QoS information to map the QFI to the service flow identifier (or, alternatively, to map the QFI to a 5G QoS Identifier (5QI), and to map the 5QI to the service flow identifier), and/or to map the one or more QoS parameters to the QoS policy information. In this way, the AGF device may maintain a mapping of QFIs to service flow identifiers (e.g., that are associated with service flows between the cable modem device and the CMT).

As shown by reference number 115, the AGF device may send a service flow creation message (e.g., to the CMTS). The service flow creation message may include the QoS match criteria information (or at least some of the QoS match criteria information). For example, the service flow creation message may indicate that a first service flow (e.g., a downstream service flow) and a second service flow (e.g., an upstream service flow) are to be created between the cable modem device and the CMTS, and wherein each service flow is to be associated with the service flow identifier and to provide a level of service quality that is associated with the QoS policy information.

In some implementations, the AGF device and the CMTS may be connected via a COPS interface between the AGF device and the CMTS. Thus, the AGF device may send the service flow creation message to the CMTS via the COPS interface. Accordingly, the service flow creation message may be a COPS message.

Alternatively, the AGF device and the CMTS may be connected by another type of interface between the AGF device and the CMTS (e.g., that both the AGF device and the CMTS are configured to support). The interface may be, for example, a representational state transfer (REST) interface, a generic control plane (GCP) interface, a simple network management protocol (SNMP) interface, a hypertext transfer protocol (HTTP) interface, a HTTP secure (HTTPS) interface, a proprietary interface (e.g., that is specifically configured to connect the AGF device and the CMTS), or a similar type of interface. Thus, the AGF device may send the service flow creation message to the CMTS via a REST interface, a GCP interface, an SNMP interface, an HTTP interface, an HTTPS interface, a proprietary interface, or a similar type of interface. Accordingly, the service flow creation message may be a REST message, a GCP message, an SNMP message, an HTTP message, an HTTPS message, a proprietary message, or a similar type of message.

As shown by reference number 120, the CMTS may send the service flow creation message (e.g., to the cable modem device). In some implementations, the CMTS and the cable modem device may be connected via a first default service flow (e.g., a default downstream service flow) and via a second default service flow (e.g., a default upstream service flow), and therefore the CMTS may send the service flow creation message to the cable modem device via the first default service flow. Each of the default service flows may be associated with a cable network protocol, such as a data over cable service interface specification (DOCSIS) protocol, or another wireline connection protocol, and therefore the CMTS may send the service flow creation message as a message associated with the cable network protocol (e.g., as a DOCSIS message).

Figure 1B:
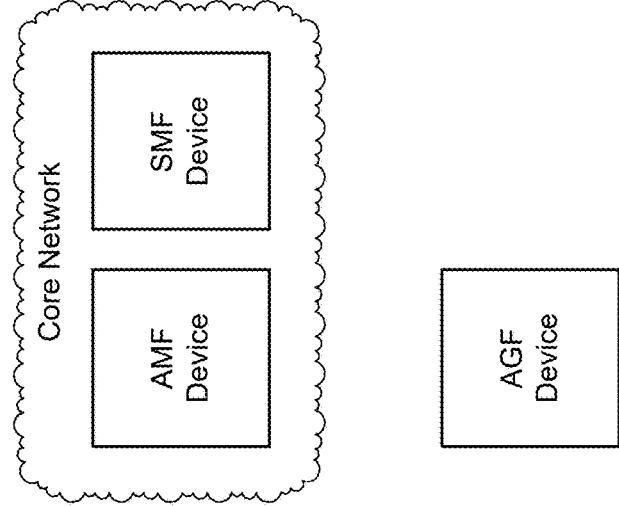
Figure 1B:
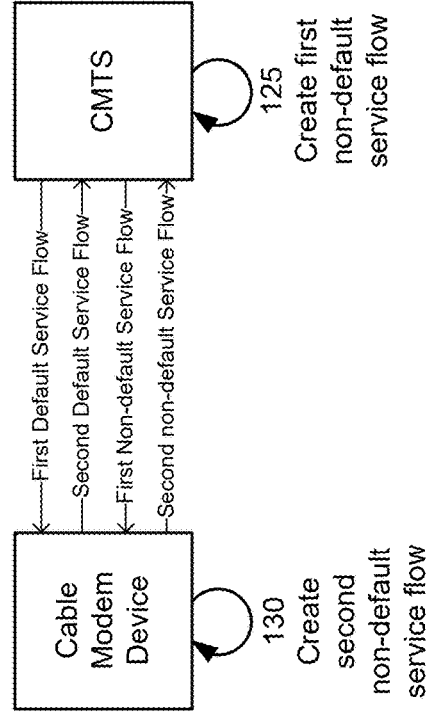

As shown in FIG. 1B, and by reference number 125, the CMTS may create (e.g., based on the service flow creation message received from the AGF device) a first non-default service flow (e.g., between the CMTS and the cable modem device). The first non-default service flow may support transmission of data packets from the CMTS to the cable modem device (e.g., the first non-default service flow may be a non-default downstream service flow). The first non-default service flow may be associated with the service flow identifier and may provide a level of service quality that is associated with the QoS policy information. In some implementations, the first non-default service may be associated with the cable network protocol (e.g., the first non-default service may be associated with the DOCSIS protocol).

As shown by reference number 130, the cable modem device may create a second non-default service flow (e.g., between the cable modem device and the CMTS). The second non-default service flow may support transmission of data packets from the cable modem device to the CMTS (e.g., the second non-default service flow may be a non-default upstream service flow). The second non-default service flow may be associated with the service flow identifier and may provide a level of service quality that is associated with the QoS policy information. In some implementations, the second non-default service may be associated with the cable network protocol (e.g., the second non-default service may be associated with the DOCSIS protocol).

Figure 1C:
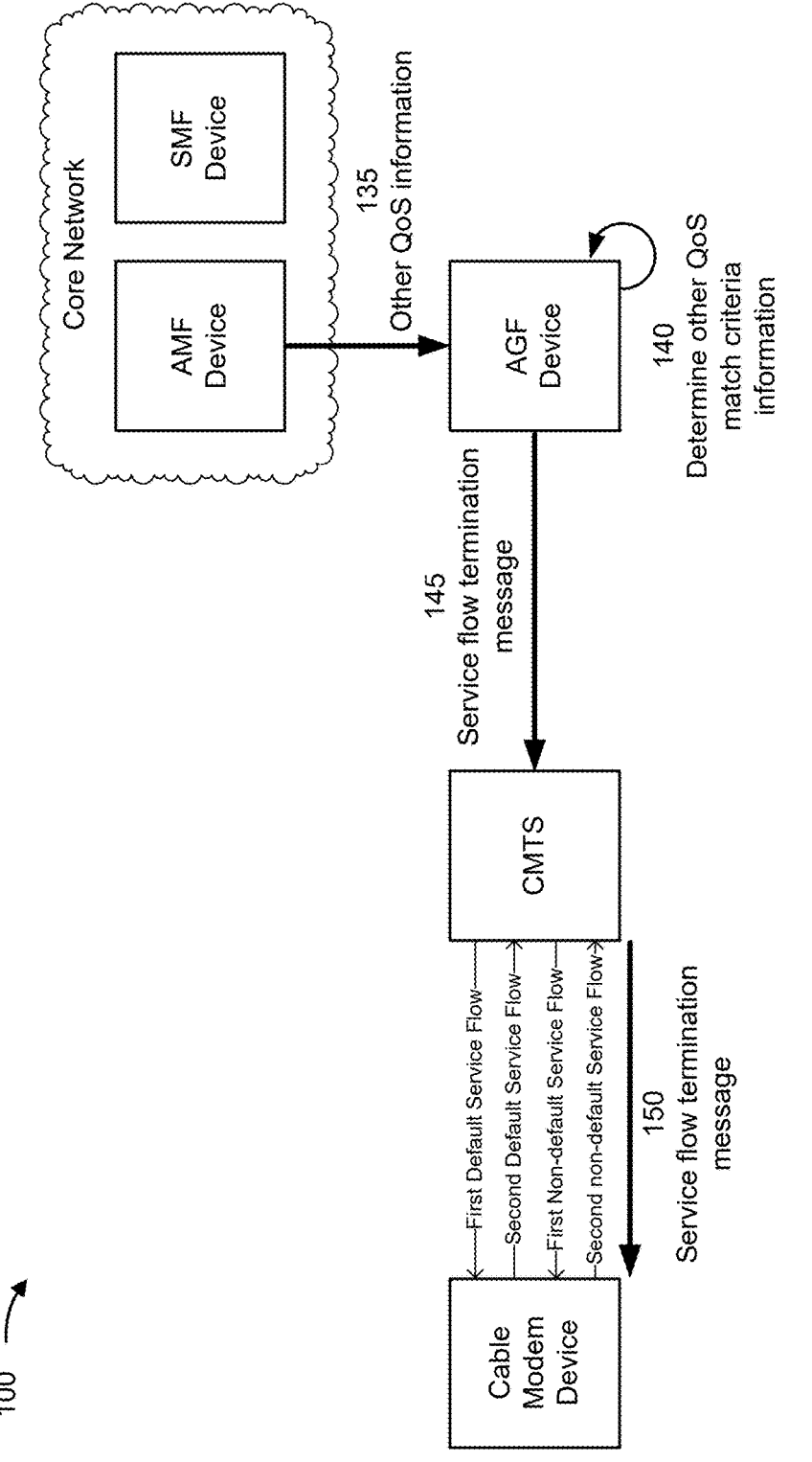

As shown in FIG. 1C, and by reference number 135, the AGF device may obtain other QoS information. The other QoS information may be associated with the PDU session of the cable modem device. For example, the other QoS information may indicate the QFI with the packet flow of the PDU session of the cable modem device and, optionally, may indicate the one or more QoS parameters associated with the packet flow. In some implementations, the other QoS information may indicate that any service flow associated with the QFI and/or the one or more QoS parameters is to be terminated. In some implementations, the other QoS information may be referred to as other 5G QoS information (e.g., when the core network is a 5G core network and the PDU session is associated with the 5G core network).

In some implementations, the AGF device may obtain the other QoS information from the core network (e.g., in a similar manner as that described herein in relation to FIG. 1A and reference number 105). For example, the AMF device (or the SMF device, via the AMF device) may provide the other QoS information to the AGF device via the interface of the core network. Accordingly, the AGF device may receive the other QoS information from the core network (e.g., from the AMF device) via the interface of the core network.

As shown by reference number 140, the AGF device may determine other QoS match criteria information. The other QoS match criteria may indicate the service flow identifier that is associated with the QFI (e.g., that is indicated by the other QoS information) and, optionally, the QoS policy information associated with the one or more QoS parameters (e.g., that are indicated by the other QoS information). In some implementations, the other QoS match criteria may indicate that any service flow associated with the service flow identifier and/or the QoS policy information is to be terminated.

The AGF device may determine the other QoS match criteria information based on the other QoS information. For example, the AGF device may process the other QoS information to map the QFI to the service flow identifier (or, alternatively, to map the QFI to a 5QI, and to map the 5QI to the service flow identifier), and/or to map the one or more QoS parameters to the QoS policy information. Additionally, the AGF device may cause the other QoS match criteria to indicate that any service flow associated with the service flow identifier and/or the QoS policy information is to be terminated (e.g., based on the other QoS information indicating that any service flow associated with the QFI and/or the one or more QoS parameters is to be terminated).

As shown by reference number 145, the AGF device may send a service flow termination message (e.g., to the CMTS). The service flow creation termination may include the other QoS match criteria information (or at least some of the other QoS match criteria information). For example, the service flow termination message may indicate that a first service flow (e.g., a downstream service flow) and a second service flow (e.g., an upstream service flow) are to be terminated between the cable modem device and the CMTS, and wherein each service flow is to be associated with the service flow identifier and a level of service quality that is associated with the QoS policy information. In some implementations, the AGF device may send the service flow termination message to the CMTS via the interface between the AGF device and the CMTS. Accordingly, the service flow termination message may be a COPS message, a REST message, a GCP message, an SNMP message, an HTTP message, an HTTPS message, or a proprietary message.

As shown by reference number 150, the CMTS may send the service flow termination message (e.g., to the cable modem device). In some implementations, the CMTS may send the service flow creation message to the cable modem device via the first default service flow (e.g., the default downstream service flow) or the first non-default service flow (e.g., the non-default downstream service flow). The CMTS may send the service flow termination message as a message associated with the cable network protocol (e.g., as a DOCSIS message).

Figure 1D:
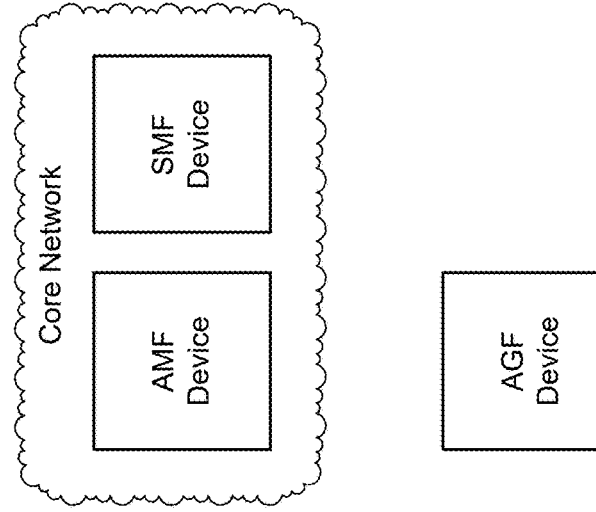
Figure 1D:
Figure 1D:
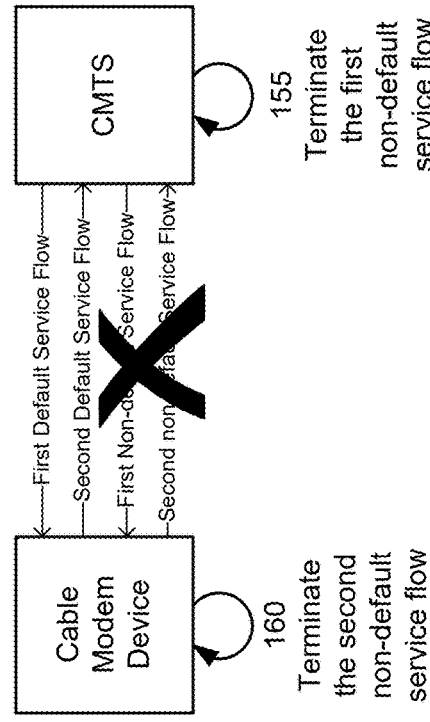

As shown in FIG. 1D, and by reference number 155, the CMTS may terminate (e.g., based on the service flow termination message received from the AGF device) the first non-default service flow (e.g., between the CMTS and the cable modem device). For example, the CMTS may identify, based on the service flow identifier and the QoS policy information indicated by the other QoS match criteria information of the service flow termination message, the first non-default service flow, and may terminate the first non-default service flow based on the other QoS match criteria information of the service flow termination message indicating that that any service flow associated with the service flow identifier and/or the QoS policy information is to be terminated.

As shown by reference number 160, the cable modem device may terminate (e.g., based on the service flow termination message received from the CMTS) the second non-default service flow (e.g., between the cable modem device and the CMTS). For example, the cable modem device may identify, based on the service flow identifier and the QoS policy information indicated by the other QoS match criteria information of the service flow termination message, the second non-default service flow, and may terminate the second non-default service flow based on the other QoS match criteria information of the service flow termination message indicating that that any service flow associated with the service flow identifier and/or the QoS policy information is to be terminated.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
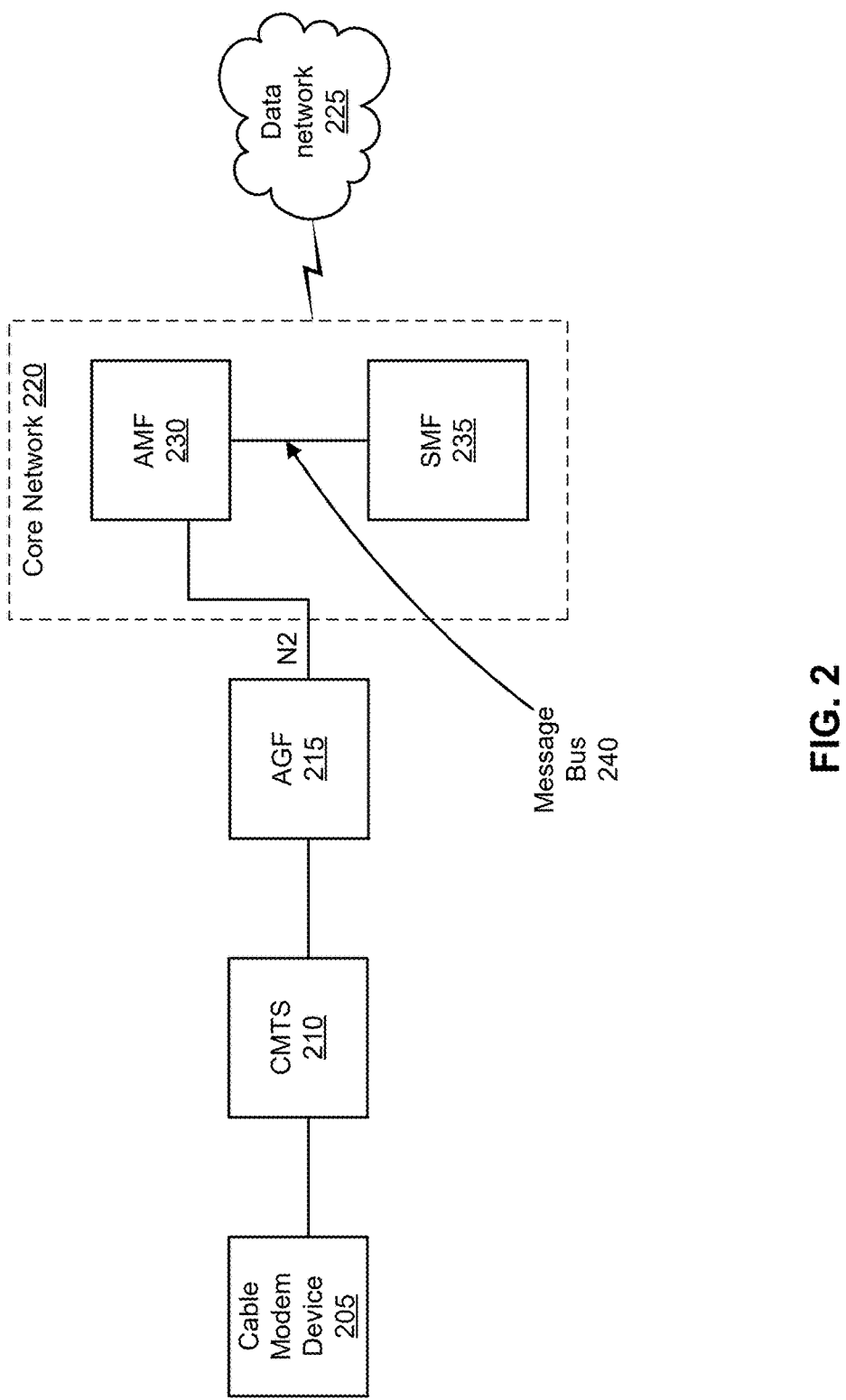
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include cable modem device 205, CMTS 210, AGF 215, a core network 220, and a data network 225. Devices and/or networks of example environment 200 may interconnect via wired connections, wireless connections, or a combination of wired and wireless connections.

Cable modem device 205 includes one or more devices capable of receiving, generating, storing, processing, and/or providing information, such as information described herein. Cable modem device 205 may be, may be similar to, or may include, the cable modem device described herein in relation to FIGS. 1A-1D. Cable modem device 205 may include a cable modem, or a similar device. In some implementations, cable modem device 205 may include a residential gateway (e.g., a 5G residential gateway (5G-RG), a 5G cable residential gateway (5G-CRG), or another type of residential gateway), a customer premises equipment (CPE), a user equipment (UE), a network device (e.g., a label switching router (LSR), a label edge router (LER), an ingress router, an egress router, a provider router, a virtual router, a gateway, a switch, a firewall, a hub, a bridge, a reverse proxy, a proxy server, a cloud server, a data center server, a load balancer, and/or the like), or a similar type of device. In some implementations, cable modem device 205 may receive network traffic from and/or may provide network traffic to core network 220, such as via CMTS 210 and AGF 215. In some implementations, cable modem device 205 may be connected to CMTS 210 and/or AGF 215 via a wireline connection.

CMTS 210 includes one or more devices capable of receiving, generating, storing, processing, and/or providing information, such as information described herein. CMTS 210 may be, may be similar to, or may include, the CMTS described herein in relation to FIGS. 1A-1D. CMTS 210 may facilitate communication between cable modem device 205 and the core network 220. CMTS 210 may include one or more stream modulators (e.g., one or more of an upstream modulator and a downstream modulator) and/or one or more stream demodulators (e.g., one or more of an upstream demodulator and a downstream demodulator).

AGF 215 may include one or more devices, between a wireline access infrastructure (e.g., that includes cable modem device 205 and CMTS 210) and core network 220, that support residential gateways (e.g., cable modem device 205) that support 5G non-access stratum (NAS) signaling and residential gateways that are purely wireline. AGF 215 connects to one or more functional elements of the core network 220 (e.g., AMF 230 and/or SMF 235) via an N2 interface.

In some implementations, core network 220 may include an example functional architecture in which systems and/or methods described herein may be implemented. For example, core network 220 may include an example architecture of a 5G next generation (NG) core network included in a 5G wireless telecommunications system, and may include physical elements, virtual elements, or a combination of physical and virtual elements. While the example architecture of core network 220 shown in FIG. 2 may be an example of a service-based architecture, in some implementations, core network 220 may be implemented as a reference-point architecture.

As shown in FIG. 2, core network 220 may include a number of functional elements. The functional elements may include, for example, an AMF 230 and an SMF 235, as well as other functional elements. These functional elements may be communicatively connected via a message bus 240. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

AMF 230 includes one or more devices that act as a termination point for NAS signaling, mobility management, and/or the like. SMF 235 includes one or more devices that support the establishment, modification, and release of communications sessions in the wireless telecommunications system.

Message bus 240 represents a communication structure for communication among the functional elements. In other words, message bus 240 may permit communication between two or more functional elements. The message bus 240 may be a logical and/or physical communication structure for communication among the functional elements. Accordingly, the message bus 240 may permit communication between two or more functional elements, whether logically (e.g., using one or more application programming interfaces (APIs), among other examples) and/or physically (e.g., using one or more wired and/or wireless connections).

Data network 225 includes one or more wired and/or wireless data networks. For example, data network 225 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
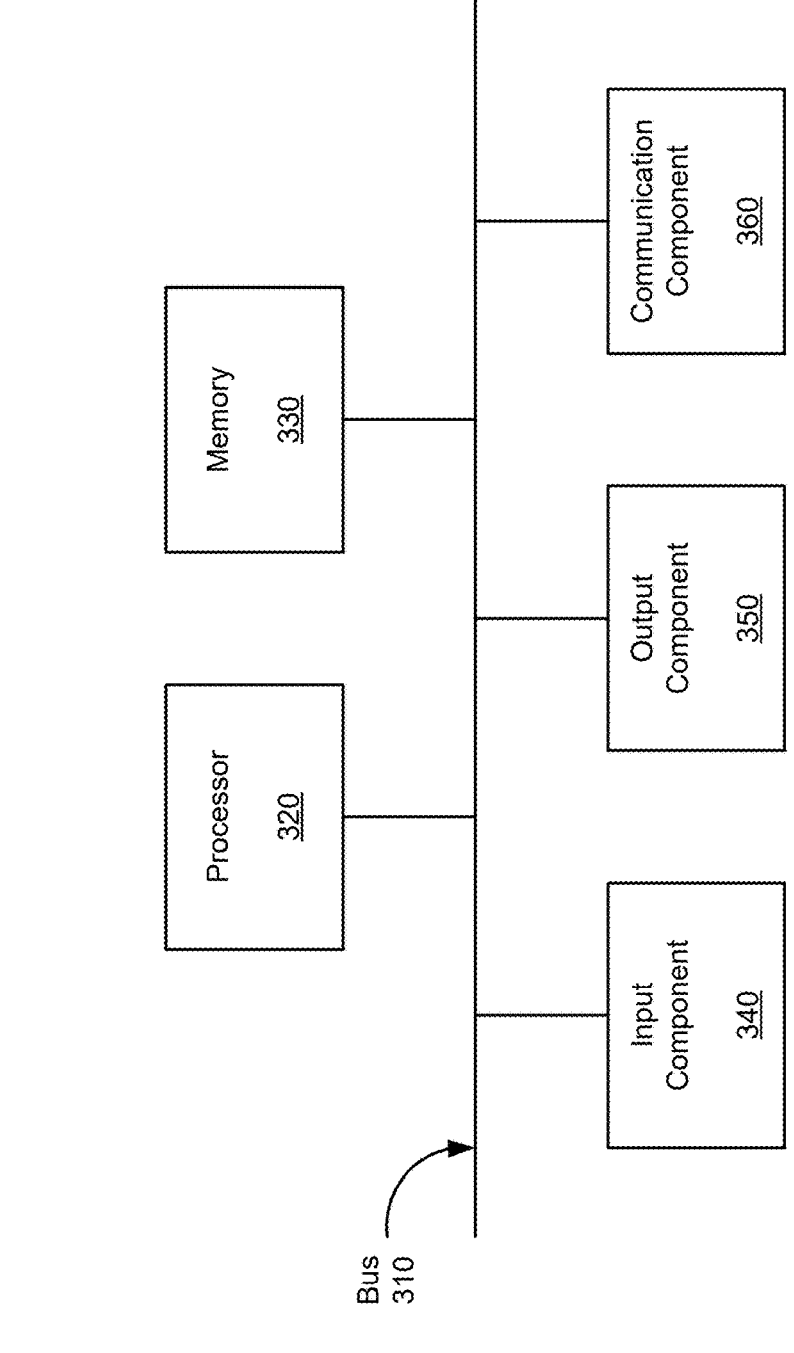
FIG. 3 is a diagram of example components of a device associated with enabling dynamic service flows in CCNs.

FIG. 3 is a diagram of example components of a device 300 associated with enabling dynamic service flows in CCNs. The device 300 may correspond to cable modem device 205, CMTS 210, AGF 215, AMF 230, and/or SMF 235. In some implementations, cable modem device 205, CMTS 210, AGF 215, AMF 230, and/or SMF 235 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
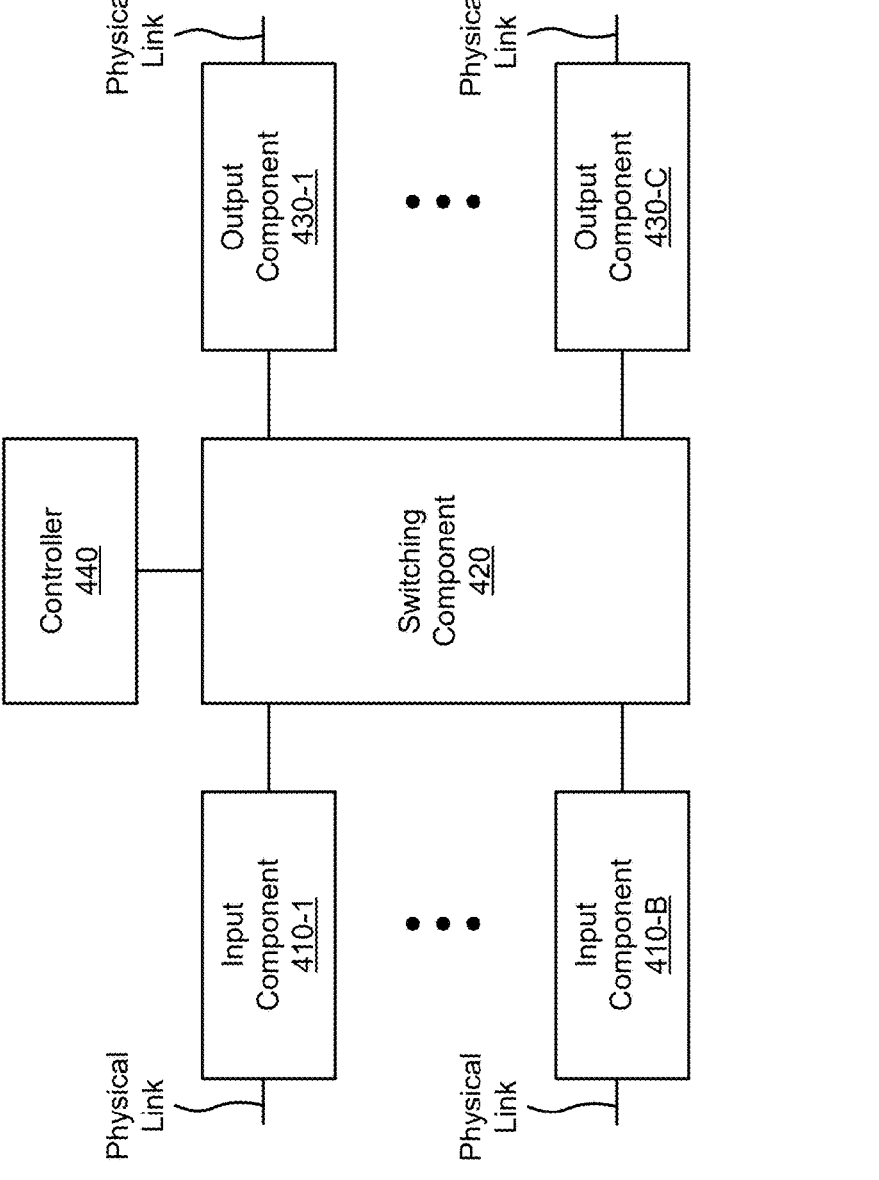
FIG. 4 is a diagram of example components of a device associated with enabling dynamic service flows in CCNs.

FIG. 4 is a diagram of example components of a device 400 associated with enabling dynamic service flows in CCNs. Device 400 may correspond to cable modem device 205, CMTS 210, AGF 215, AMF 230, and/or SMF 235. In some implementations, cable modem device 205, CMTS 210, AGF 215, AMF 230, and/or SMF 235 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
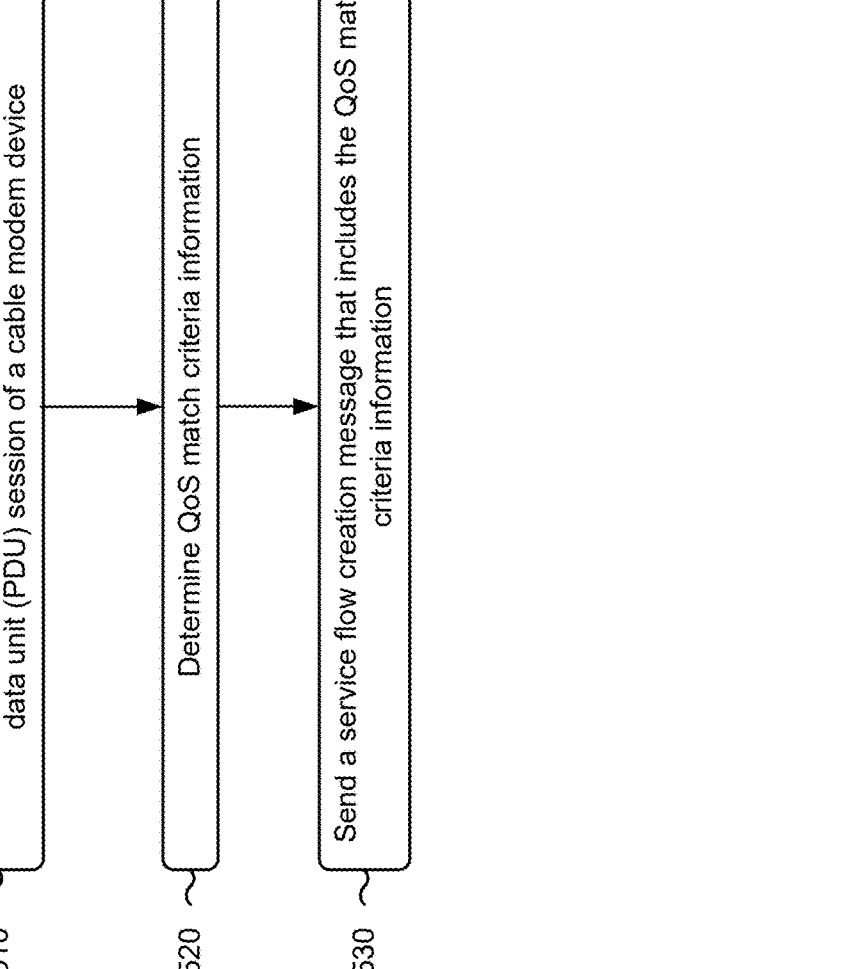
FIG. 5 is a flowchart of an example process associated with enabling dynamic service flows in CCNs.

FIG. 5 is a flowchart of an example process 500 associated with enabling dynamic service flows in CCNs. In some implementations, one or more process blocks of FIG. 5 are performed by an AGF device (e.g., AGF 215). In some implementations, one or more process blocks of FIG. 5 are performed by another device or a group of devices separate from or including the client device, such as cable modem device (e.g., cable modem device 205), a CMTS (e.g., CMTS 210), an AMF device (e.g., AMF 230), and/or an SMF device (e.g., SMF 235). Additionally, or alternatively, one or more process blocks of FIG. 5 may be performed by one or more components of device 300, such as processor 320, memory 330, input component 340, output component 350, and/or communication component 360. Additionally, or alternatively, one or more process blocks of FIG. 5 may be performed by one or more components of device 400, such as input component 410, switching component 420, output component 430, and/or controller 440.

As shown in FIG. 5, process 500 may include receiving QoS information associated with a PDU session of a cable modem device (block 510). For example, the AGF device may receive, from a core network, QoS information associated with a PDU session of a cable modem device, as described above.

As further shown in FIG. 5, process 500 may include determining QoS match criteria information (block 520). For example, the AGF device may determine, based on the QoS information, QoS match criteria information, as described above.

As further shown in FIG. 5, process 500 may include sending a service flow creation message that includes the QoS match criteria information (block 530). For example, the AGF device may send, to a CMTS associated with the cable modem device, a service flow creation message that includes the QoS match criteria information, as described above.

Process 500 may include additional implementations, such as any single implementation or any combination of implementations described below and/or in connection with one or more other processes described elsewhere herein.

In a first implementation, sending the service flow creation message enables the CMTS to create a first service flow between the CMTS and the cable modem device, and the cable modem device to create a second service flow between the cable modem device and the CMTS.

In a second implementation, alone or in combination with the first implementation, the QoS information indicates a QFI associated with a packet flow of the PDU session and one or more QoS parameters associated with the packet flow, and the QoS match criteria information indicates a service flow identifier associated with the QFI and QoS policy information associated with the one or more QoS parameters.

In a third implementation, alone or in combination with one or more of the first and second implementations, the service flow identifier includes at least one of an IP DSCP, or a VLAN PCP.

In a fourth implementation, alone or in combination with one or more of the first through third implementations, the service flow creation message is one of a COPS message, a REST message, a GCP message, an SNMP message, an HTTP message, an HTTPS message, or a proprietary message.

In a fifth implementation, alone or in combination with one or more of the first through fourth implementations, the AGF device sends the service flow creation message via an interface between the AGF device and the CMTS, wherein the interface is one of a COPS interface, a REST interface, a GCP interface, an SNMP interface, an HTTP interface, an HTTPS interface, or a proprietary interface.

In a sixth implementation, alone or in combination with one or more of the first through fifth implementations, process 500 includes receiving, from an AMF device of the core network, other QoS information associated with the PDU session of the cable modem device, determining, based on the other QoS information, other QoS match criteria information, and sending, to the CMTS, a service flow termination message that includes the other QoS match criteria information.

In a seventh implementation, alone or in combination with one or more of the first through sixth implementations, sending the service flow termination message enables the CMTS to terminate a first service flow between the CMTS and the cable modem device, and the cable modem device to terminate a second service flow between the cable modem device and the CMTS.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a PDU, a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An access gateway function (AGF) device, comprising:
one or more memories; and
one or more processors to:
  receive, from an access and mobility management function (AMF) device of a core network, quality of service (QoS) information associated with a packet data unit (PDU) session of a cable modem device;
  determine, based on the QoS information, QoS match criteria information;
  send, to a cable modem termination system (CMTS) communicatively coupled to the cable modem device, a service flow creation message that includes the QoS match criteria information; and
  send, to the CMTS, a service flow termination message to enable one or more of:
    the CMTS to terminate a first service flow between the CMTS and the cable modem device, or
    the cable modem device to terminate a second service flow between and the cable modem device and the CMTS.

2. The AGF device of claim 1, wherein sending the service flow creation message enables:
  the CMTS to create a first service flow between the CMTS and the cable modem device; and
  the cable modem device to create a second service flow between the cable modem device and the CMTS.

3. The AGF device of claim 1, wherein:
  the QoS information indicates a QoS flow identifier (QFI) associated with a packet flow of the PDU session and one or more QoS parameters associated with the packet flow; and
  the QoS match criteria information indicates a service flow identifier associated with the QFI and QoS policy information associated with the one or more QoS parameters.

4. The AGF device of claim 3, wherein the service flow identifier includes at least one of:
  an Internet protocol (IP) differentiated services code point (DSCP), or
  a virtual local area network (VLAN) priority code point (PCP).

5. The AGF device of claim 1, wherein the service flow creation message is one of:
  a common open policy service (COPS) message,
  a representational state transfer (REST) message,
  a generic control plane (GCP) message,
  a simple network management protocol (SNMP) message,
  a HTTP secure (HTTPS) message, or
  a proprietary message.

6. The AGF device of claim 1, wherein the AGF device sends the service flow creation message via an interface between the AGF device and the CMTS, wherein the interface is one of:
  a common open policy service (COPS) interface,
  a representational state transfer (REST) interface,
  a generic control plane (GCP) interface,
  a simple network management protocol (SNMP) interface,
  a hypertext transfer protocol (HTTP) interface,
  a HTTP secure (HTTPS) interface, or
  a proprietary interface.

7. The AGF device of claim 1, wherein the one or more processors are further to:
  receive, from the AMF device, other QoS information associated with the PDU session of the cable modem device;
  determine, based on the other QoS information, other QoS match criteria information; and
  wherein the one or more processors, to send the service flow termination message are to:
    send, to the CMTS, the service flow termination message that includes the other QoS match criteria information.

8. The AGF device of claim 1, wherein the one or more processors are further to:
  determine the other QoS match criteria information based on the other QoS information process the other QoS information to map one or more of:
  a QoS flow identifier to a service flow identifier, or
  one or more QoS parameters to a QoS policy information.

9. A non-transitory computer-readable medium storing a set of instructions, the set of instructions comprising:
  one or more instructions that, when executed by one or more processors of an access gateway function (AGF) device, cause the AGF device to:
    receive, from a core network, quality of service (QoS) information associated with a packet data unit (PDU) session of a cable modem device;
    send, to a cable modem termination system (CMTS) communicatively coupled to the cable modem device, a service flow creation message that includes QoS match criteria information associated with the QoS information; and
    send, to the CMTS, a service flow termination message to enable one or more of:
      the CMTS to terminate a first service flow between the CMTS and the cable modem device; and
      the cable modem device to terminate a second service flow between and the cable modem device and the CMTS.

10. The non-transitory computer-readable medium of claim 9, wherein sending the service flow creation message enables:
  the CMTS to create a first service flow between the CMTS and the cable modem device; and
  the cable modem device to create a second service flow between the cable modem device and the CMTS.

11. The non-transitory computer-readable medium of claim 9, wherein:
  the QoS information indicates a QoS flow identifier (QFI) associated with a packet flow of the PDU session; and
  the QoS match criteria information indicates a service flow identifier associated with the QFI.

12. The non-transitory computer-readable medium of claim 11, wherein the service flow identifier includes at least one of:
  an Internet protocol (IP) differentiated services code point (DSCP), or
  a virtual local area network (VLAN) priority code point (PCP).

13. The non-transitory computer-readable medium of claim 9, wherein the service flow creation message is one of:
  a common open policy service (COPS) message,
  a representational state transfer (REST) message,
  a generic control plane (GCP) message,
  a simple network management protocol (SNMP) message,
  a HTTP secure (HTTPS) message, or
  a proprietary message.

14. The non-transitory computer-readable medium of claim 9, wherein the AGF device sends the service flow creation message via an interface between the AGF device and the CMTS, wherein the interface is one of:

a common open policy service (COPS) interface, a representational state transfer (REST) interface, a generic control plane (GCP) interface, a simple network management protocol (SNMP) interface, a hypertext transfer protocol (HTTP) interface, a HTTP secure (HTTPS) interface, or a proprietary interface.

15. The non-transitory computer-readable medium of claim 9, wherein the one or more instructions further cause the AGF to:

receive, from the core network, other QoS information associated with the PDU session of the cable modem device; and send, to the CMTS, a service flow termination message that includes other QoS match criteria information associated with the other QoS information.

16. The non-transitory computer-readable medium of claim 9, wherein the one or more instructions further cause the AGF to:

determine the other QoS match criteria information based on the other QoS information process the other QoS information to map one or more of:

a QoS flow identifier to a service flow identifier, or one or more QoS parameters to a QoS policy information.

17. A method, comprising:

obtaining, by an access gateway function (AGF) device, quality of service (QoS) information associated with a packet data unit (PDU) session of a cable modem device; and sending, by the AGF device, to a cable modem termination system (CMTS) communicatively coupled to the cable modem device, and based on the QoS information, a service flow creation message; and sending, by the AGF device and to the CMTS, a service flow termination message to enable one or more of:

the CMTS to terminate a first service flow between the CMTS and the cable modem device, or the cable modem device to terminate a second service flow between and the cable modem device and the CMTS.

18. The method of claim 17, wherein sending the service flow creation message enables:

the CMTS to create a first service flow between the CMTS and the cable modem device; and the cable modem device to create a second service flow between the cable modem device and the CMTS.

19. The method of claim 17, wherein the service flow creation message is one of:

a common open policy service (COPS) message, a representational state transfer (REST) message, a generic control plane (GCP) message, a simple network management protocol (SNMP) message, a hypertext transfer protocol (HTTP) message, a HTTP secure (HTTPS) message, or a proprietary message.

20. The method of claim 17, wherein the AGF device sends the service flow creation message via an interface between the AGF device and the CMTS, wherein the interface is one of:

a common open policy service (COPS) interface, a representational state transfer (REST) interface, a generic control plane (GCP) interface, a simple network management protocol (SNMP) interface, a hypertext transfer protocol (HTTP) interface, a HTTP secure (HTTPS) interface, or a proprietary interface.

* * * * *